United States Statutory Invention Registration [19]

[11] Reg. Number: H775

Rouse et al. [43] Published: May 1, 1990

[54] METHOD OF ASSEMBLY OF COMPACTED POWDER AND EXPLOSIVE CHARGE FOR EFFECTIVE DISSEMINATION

[75] Inventors: William G. Rouse, Aberdeen; Ronald E. Rhea, Bel Air; Michael J. Burnham, Kingsville, all of Md.; Connie S. Kilgore, Delta, Pa.; John P. Fiala, Forest Hill; Lisa A. Bray, Joppa, both of Md.

[73] Assignee: The United States of America as represented by the Secretary of the Army, Washington, D.C.

[21] Appl. No.: 387,905

[22] Filed: Aug. 1, 1989

[51] Int. Cl.[5] ..... F42B 3/00

[52] U.S. Cl. ..... 86/20.1; 102/334; 264/3.3; 264/109; 252/305

[58] Field of Search ..... 86/20.1; 264/109, 3.3; 252/305; 102/334

*Primary Examiner*—Brooks H. Hunt
*Assistant Examiner*—Ngoclan Mai
*Attorney, Agent, or Firm*—Lane Anthony T.; Edward Goldberg; Edward F. Costigan

[57] ABSTRACT

A minimum hazard visual screening cloud-forming product is made by forming a slurry of fine spheres of titanium dioxide composition, of submicron diameter, together with a volatile surface-wetting agent liquid, in the form of a liquid hydrocarbon, extruding and severing the extended slurry mass into a desired container shape, in particular, a hollow cylindrical shape, and drying the mass. An HE explosive mass is inserted into the resulting compacted hollow cylinder, enabling bursting of the compacted mass.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF ASSEMBLY OF COMPACTED POWDER AND EXPLOSIVE CHARGE FOR EFFECTIVE DISSEMINATION

This invention relates to a method of assembly of compacted powders, particularly very fine titanium dioxide spheres which are normally very light and fluffy, together with an explosive charge for aerosoling the resulting compacted mass of particles.

Efforts to develop a minimum hazard screening cloud that will protect military equipment from visual detection have been underway for a number of years. Various military vehicles are conventionally equipped with smoke grenades and suitable launchers, such as launching tubes or barrels, singly or in clusters, whereby the grenades are launched to provide a visual screen relative to the vehicle.

It is an object of the invention to form a compact mass of fine spheres of titanium dioxide composition for use in a volume-limited grenade to enable dissemination of the particles as a minimum hazard visual screening cloud, in a manner compatible with current vehicle-mounted smoke grenade launcher systems. Screening effectiveness is optimized by providing an HE explosive central burster, within the resultant densely compacted specially-sized spherical composition of siloxane coated titanium dioxide for a volume-limited device such as a minimum hazard visual safe smoke screening grenade.

Still other objects and attendant advantages will become apparent to those skilled in the art, from a reading of the following detailed description of an illustrative mode of practice of the invention.

Very fine spheres of titanium dioxide composition, particularly siloxane coated spheres, are suitably compacted by wetting and mixing with a suitable volatile wetting liquid in a container. Preferably a liquid hydrocarbon, such as trichloroethylene, trichloroethane, methylene chloride, etc., is used. A slurry mixture is formed by stirring the two mixed components of spheres and liquid hydrocarbon, as with a paddle.

The slurry mixture is fed under pressure through an extruder, from which the compacted slurry is extruded under a predetermined pressure (40–50 psig, into a suitably shaped tubular porous container.

The compacted mixture is then permitted to dry which may be suitably achieved by simple evaporative drying under a wide range of normal ambient room conditions of temperature and pressure, such as, for example only, from 40–90 degrees F., and 28–30 inches mercury. The dried hollow cylinders of compacted material provide the desired mass of compacted spheres.

In sequence, a cylindrical mass of HE explosive is inserted within a guide tube, and a cover is suitably secured in the end of the body over the entire assembly of the final compacted mass of fine spheres of titanium dioxide and the HE explosive cylindrical mass. The slurry mixing, the extruding, and drying may generally be employed to reduce the volume of the spheres forty percent (40%). A compact generally cohesive mass is formed that is nevertheless capable of being aerosoled by the HE explosive mass.

This entire assembly may suitably form a projectile or grenade having a closed base with a tubular body and a cover, which may be suitably projected into the atmosphere and caused to burst by detonating the HE explosive, as by suitable ignition and detonation means.

A minimum hazard visual screening cloud will thus be formed in the atmosphere at the desired location.

In carrying out the foregoing method, it is an important and integral part thereof to employ suitable spherical particle compositions, configurations, and sizes. To this end, titanium dioxide compositions have been found compatible with the necessary HE explosive blast. Particularly, siloxane coated titanium dioxide particles have been successfully employed with adequate aerosolizing and cloud retention time, such being generally spherical in shape and being generally of a size of the order of approximately 0.2–0.5 microns.

Coated spheres of titanium dioxide which are employed as pigments in the paint industry, have been found to be highly suitable for practice of this invention.

It has been found that a hollow cylindrical or tubular shape is a desirable configuration to enable both adequate bursting of the compact particle mass to aerosol the spheres in the atmosphere, and also to enable its use in a conventionally launchable cylindrical grenade form.

The term explosive is generally accepted as being a composition whose consumption rate is 20,000 feet per second or greater.

A ratio of the weight of the compacted mass of spheres relative to the HE explosive charge mass may be employed within the general range of approximately 20:1 to 30:1, with an optimum ratio being approximately 25:1, particularly for titanium dioxide. This yields maximum visual screening attenuation over an adequate area to screen the source vehicle and the surrounding personnel or vehicles from enemy vehicles and enemy personnel, consistent with grenade volume and shape constraints imposed by launching from a launch tube of desired conventional relatively small size.

A particular advantage of the treated titanium dioxide, for the compacted powder, is the ability of these spherical particles to provide a highly effective minimum hazard visual screening cloud of adequately long retention, while not flashing or igniting as a result of the explosive bursting of the compact mass by the HE explosive.

While the invention has been illustrated and described with respect to a single illustrative embodiment, it will be appreciated that various modifications and improvements may be made without departing from the scope and spirit of the invention. Accordingly, the invention is not to be limited by the particular illustrative embodiment, but only by the scope of the appended claims.

We claim:

1. The method of forming a product which may be explosively burst apart to form a minimal hazard visual screening cloud, comprising forming a slurry mixture of fine spherical particles of titanium dioxide and a volatile liquid to thereby wet the particles, causing said particles to adhere to one another in a randomly compacted form at the bottom of said slurry mixture, and removing said volatile liquid from said mixture while maintaining said titanium dioxide particles in a nonaerosol compact adhered mass form, to thereby leave and form a compact mutually surface to surface adhered solid mass of said particles.

2. The method according to claim 1, said spherical particles having a siloxane coating.

3. The method according to claim 1, said spherical particles being approximately 0.2–0.5 microns in diameter.

4. The method according to claim 1, said particles are minimally hazardous to people and animals.

5. The method according to claim 1, said particles are minimally hazardous to the environment.

6. The method according to claim 1, in which said volatile liquid is a liquid hydrocarbon having good surface—wetting capability relative to said spherical particles.

7. The method according to claim 1, and extruding said slurry mixture to form a compacted linear mass of particles at a predetermined pressure of approximately 40 psig.

8. The method of forming a product which may be explosively burst apart to form a minimal hazard visual screening cloud, comprising forming a slurry mixture of particles and a volatile liquid in which said particles are of greater density than said liquid to thereby wet the particles, thereby causing said particles to adhere to one another in a random self-compacted form at the bottom of said slurry mixture, removing said volatile liquid from said mixture while maintaining said particles in a non-aerosol closely adjacent condition, to thereby leave and form a compact mutually adhered solid mass of said particles, in which said particles are of submicron diameter, extruding said mixture into a suitable shaped container to form a compact linear mass of particles, and separating said linear mass.

9. The method according to claim 8, further comprising drying said compact means of said particles in said container.

10. The method of claim 9, and inserting an elongate high explosive bursting charge within said compact mass of particles.

* * * * *